United States Patent
Mysliwiec et al.

(10) Patent No.: US 6,802,563 B1
(45) Date of Patent: Oct. 12, 2004

(54) ADJUSTABLE SEAT BOLSTERS

(75) Inventors: Todd A. Mysliwiec, Allen Park, MI (US); Gregory S. Fraley, Farmington Hills, MI (US); John R. Sims, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/519,896

(22) Filed: Mar. 6, 2000

(51) Int. Cl.[7] ................................................. A47C 7/02
(52) U.S. Cl. .............................. 297/284.9; 297/452.35
(58) Field of Search .............................. 297/410, 284.9, 297/452.35, 378.12, 255, 353, 284.7, 411.36, 411.35

(56) References Cited

U.S. PATENT DOCUMENTS

| | | |
|---|---|---|
| 1,375,868 A | 4/1921 | Thompson |
| 4,191,417 A | 3/1980 | Ferrara |
| 4,317,591 A | 3/1982 | Ramsey |
| 4,370,000 A * | 1/1983 | Kazaoka et al. ..... 297/284.9 X |
| 4,500,136 A | 2/1985 | Murphy et al. |
| 4,522,445 A * | 6/1985 | Goldner et al. ...... 297/284.9 X |
| 5,324,096 A | 6/1994 | Schultz |
| 5,601,332 A | 2/1997 | Schultz et al. |
| 5,615,928 A | 4/1997 | Penley |
| 5,619,949 A | 4/1997 | Dick, Jr. |
| 5,678,892 A * | 10/1997 | Heitlinger ................ 297/353 X |
| D391,791 S | 3/1998 | Smith |
| 5,769,497 A | 6/1998 | Tsai |
| 5,769,498 A | 6/1998 | Smith et al. |
| 5,785,383 A * | 7/1998 | Otero ...................... 297/255 X |
| D399,353 S * | 10/1998 | Krass et al. ............. 297/410 X |
| 5,857,743 A | 1/1999 | Ligon, Sr. et al. |
| 5,899,529 A | 5/1999 | Chaucer |
| RE36,230 E | 6/1999 | Gezari et al. |
| 5,918,938 A | 7/1999 | Miotto |
| 5,931,536 A | 8/1999 | Wu |
| 5,938,284 A | 8/1999 | Coffield |
| 5,964,505 A | 10/1999 | Koenig et al. |
| 6,010,193 A | 1/2000 | Hara et al. |
| 6,074,012 A | 6/2000 | Wu |
| 6,099,077 A * | 8/2000 | Isaacson .................. 297/410 X |
| 6,126,238 A * | 10/2000 | Klindworth ............. 297/410 X |
| 6,139,100 A * | 10/2000 | Baskin-Lockman et al. ...................... 297/410 X |
| 6,450,579 B1 * | 9/2002 | Nylander et al. .... 297/378.1 X |

* cited by examiner

Primary Examiner—Anthony D. Barfield
(74) Attorney, Agent, or Firm—Bill C. Panagos

(57) ABSTRACT

A vehicle seat assembly includes a seat back having a frame, and the frame has first and second bolster mounting portions. Each bolster mounting portion has first, second and third receptacles. The seat assembly also includes first and second bolsters selectively engageable with the first and second bolster mounting portions, respectively. Each bolster has first and second posts and is longitudinally adjustable with respect to the seat back between a first longitudinal position and a second longitudinal position. When each bolster is in the first longitudinal position, the first and second posts of the first bolster are respectively engaged with the first and second receptacles of the first bolster mounting portion, and the first and second posts of the second bolster are respectively engaged with the first and second receptacles of the second bolster mounting portion. When each bolster is in the second longitudinal position, the first and second posts of the first bolster are respectively engaged with the second and third receptacles of the first bolster mounting portion, and the first and second posts of the second bolster are respectively engaged with the second and third receptacles of the second bolster mounting portion.

28 Claims, 8 Drawing Sheets

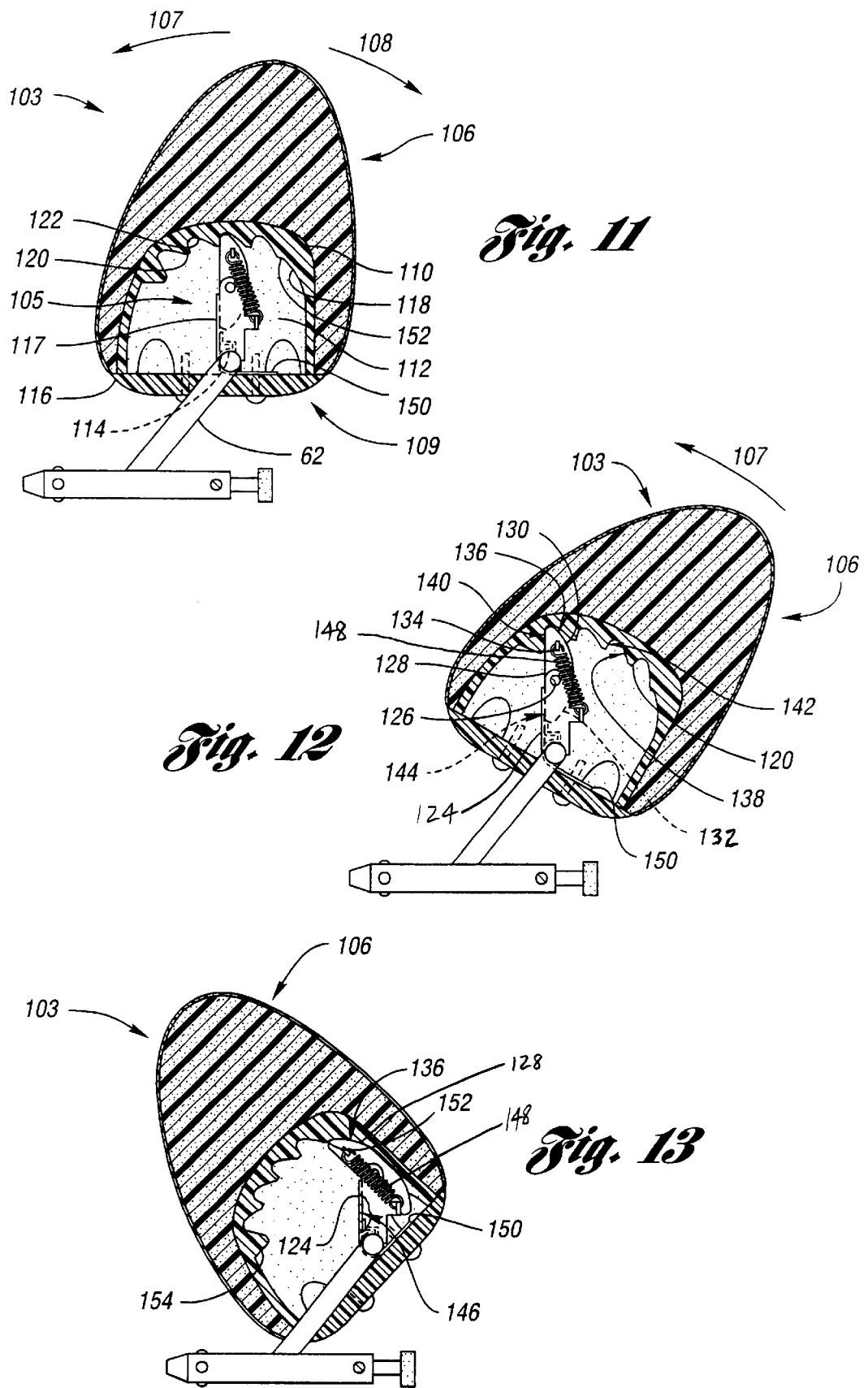

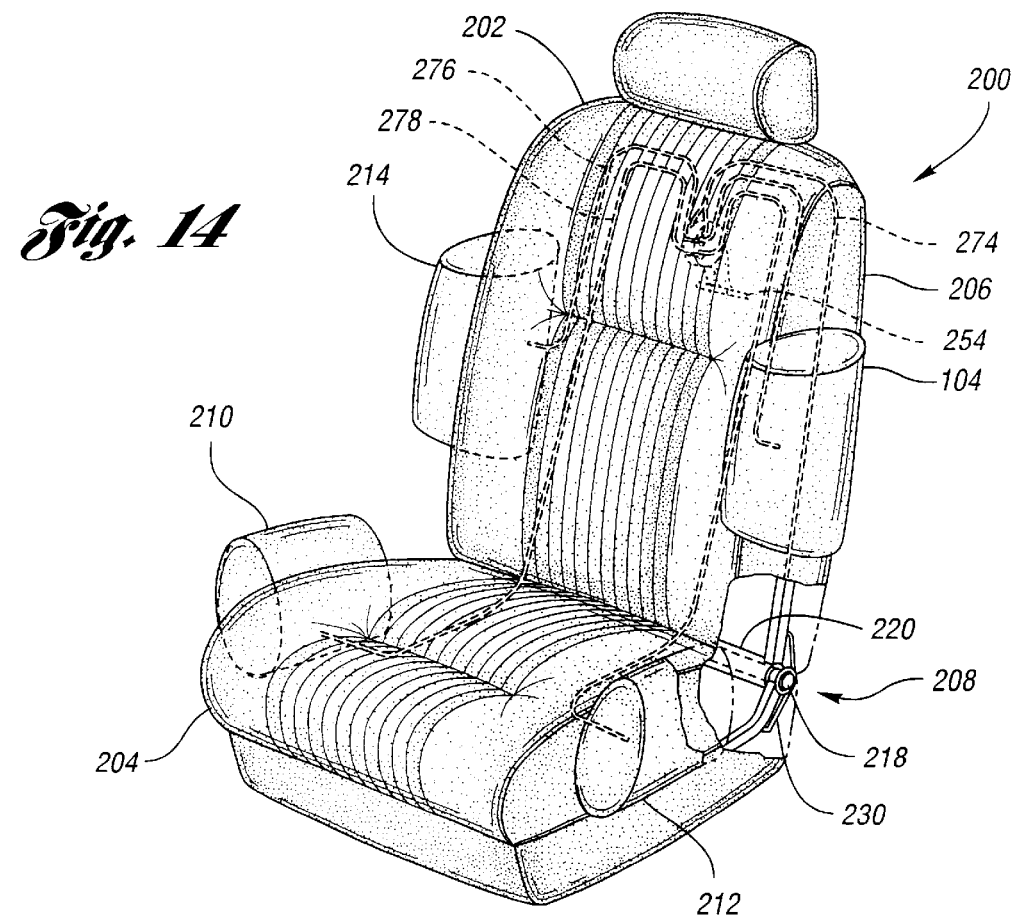
Fig. 14
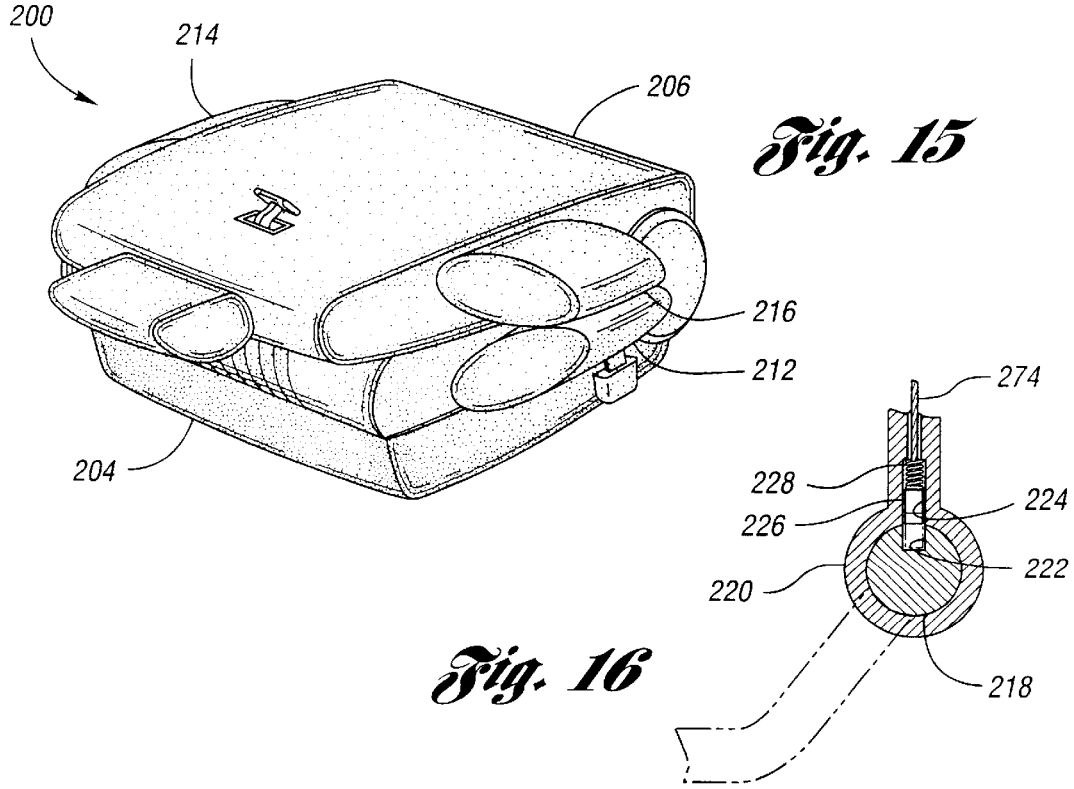
Fig. 15
Fig. 16

ADJUSTABLE SEAT BOLSTERS

TECHNICAL FIELD

The invention relates to adjustable seat bolsters for use with a motor vehicle.

BACKGROUND ART

Typically, vehicle seat assemblies are provided with side bolsters that are not adjustable. More recently, seat assemblies have been developed with side bolsters that provide limited lateral adjustability. For example, U.S. Pat. No. 5,938,284 discloses a seat assembly having a bolster and an adjustment mechanism for adjusting the support and/or lateral position of the bolster relative to a seat back. The adjustment mechanism includes a positioning member that is positionable between adjacent ribs to form a stop limit.

DISCLOSURE OF INVENTION

Under the invention, a vehicle seat assembly includes a seat body having a plurality of receptacles, and a bolster having a first engaging member that is selectively engageable with at least two receptacles such that the bolster is longitudinally adjustable with respect to the seat body. Advantageously, with such a configuration, the bolster may be adjusted to provide optimum support and comfort to various different seat occupants.

Preferably, each of the at least two receptacles has a groove, and the first engaging member includes a retractable element that is selectively engageable with the grooves. The bolster may also be provided with a release mechanism that cooperates with the retractable element to allow the retractable element to retract.

The seat body may include a seat back that includes the plurality of receptacles. Under this embodiment, the bolster is vertically adjustable with respect to the seat back. Furthermore, the plurality of receptacles may include first, second and third receptacles, and the bolster may be provided with a second engaging member that is selectively engageable with the receptacles. With such a configuration, when the bolster is in a first vertical position, the first and second engaging members are respectively engaged with the first and second receptacles. Furthermore, when the bolster is in a second vertical position different than the first vertical position, the first and second engaging members are respectively engaged with the second and third receptacles.

Advantageously, the vehicle seat assembly may be provided with any suitable number of receptacles to achieve a desired adjustability of the bolster. For example, the seat back may include a fourth receptacle for allowing the bolster described above to be adjusted to a third vertical position.

Furthermore, the bolster may include a cushioning member and a pivot mechanism connected between the cushioning member and the first engaging member such that the bolster is laterally adjustable with respect to the seat back.

Further under the invention, a vehicle seat assembly includes a seat back having a frame. The frame has first and second bolster mounting portions, and each bolster mounting portion has first, second and third receptacles. The seat assembly also includes first and second bolsters selectively engageable with the first and second bolster mounting portions, respectively. Each bolster has first and second posts and is longitudinally adjustable with respect to the seat back between a first longitudinal position and a second longitudinal position. When each bolster is in the first longitudinal position, the first and second posts of the first bolster are respectively engaged with the first and second receptacles of the first bolster mounting portion, and the first and second posts of the second bolster are respectively engaged with the first and second receptacles of the second bolster mounting portion. When each bolster is in the second longitudinal position, the first and second posts of the first bolster are respectively engaged with the second and third receptacles of the first bolster mounting portion, and the first and second posts of the second bolster are respectively engaged with the second and third receptacles of the second bolster mounting portion.

According to another aspect of the invention, a vehicle seat assembly includes a seat body and a bolster connected to the seat body. The bolster includes a cushioning member and a pivot mechanism connected between the cushioning member and the seat body for allowing the cushioning member to pivot with respect to the seat body. The pivot mechanism includes a rack having a first pocket, and a pawl that is engageable with the first pocket so as to position the cushioning member in a first pivotal position relative to the seat body. The seat assembly further includes a release device connected between the seat body and the pawl for disengaging the pawl from the pocket so that the cushioning member may pivot outwardly with respect to the seat body.

Preferably, the release device includes a release lever moveably connected to the seat body, and a cable connected between the release lever and the pawl.

More specifically, a vehicle seat assembly includes a seat body having a seat bottom and a seat back pivotally connected to the seat bottom. A pair of upper bolsters is connected on opposite sides of the seat back. Each bolster includes a bolster body, a support structure connected to the seat body, and a ratcheting mechanism connected between the support structure and the bolster body for allowing the bolster body to pivot with respect to the seat back. Each ratcheting mechanism includes a rack having a plurality of rack teeth, and a pawl that is selectively engageable with the rack teeth such that each ratcheting mechanism provides inward ratcheting pivotal movement of a respective bolster body while locking the respective bolster body against pivotal movement in an outward direction. Each ratcheting mechanism further includes a biasing member for urging a respective bolster body in the outward direction. The seat assembly further includes a release device connected between the seat body and the pawls for disengaging the pawls from the racks so that each bolster body may pivot in the outward direction, thereby allowing the seat back and seat bottom to be folded together.

The seat body may also include a lockable pivot mechanism connected between the seat back and the seat bottom for locking the seat back in a desired pivotal orientation with respect to the seat bottom. Preferably, the release device is also connected to the pivot mechanism and is operable to release the pivot mechanism so that the seat back and seat bottom may be folded together.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 11 is a cross-sectional view of the first upper bolster with the bolster cushion shown in one of a plurality of pivot positions;

FIG. 12 is a cross-sectional view of the first upper bolster with the bolster cushion shown in a rearward most position;

FIG. 13 is a cross-sectional view of the first upper bolster with the bolster cushion shown in a forward most position;

FIG. 14 is a perspective view of a third embodiment of the vehicle seat assembly that includes upper and lower bolsters pivotally connected to a seat body, wherein the seat body has a seat bottom, a seat back and a pivot mechanism connected between the seat bottom and seat back that enables the seat bottom and seat back to be folded together;

FIG. 15 is a perspective view of the vehicle seat assembly showing the seat back folded flat against the seat bottom, with the bolsters rotated outwardly with respect to the seat body;

FIG. 16 is a cross-sectional view of the pivot mechanism;

BEST MODES FOR CARRYING OUT THE INVENTION

Figure 1:
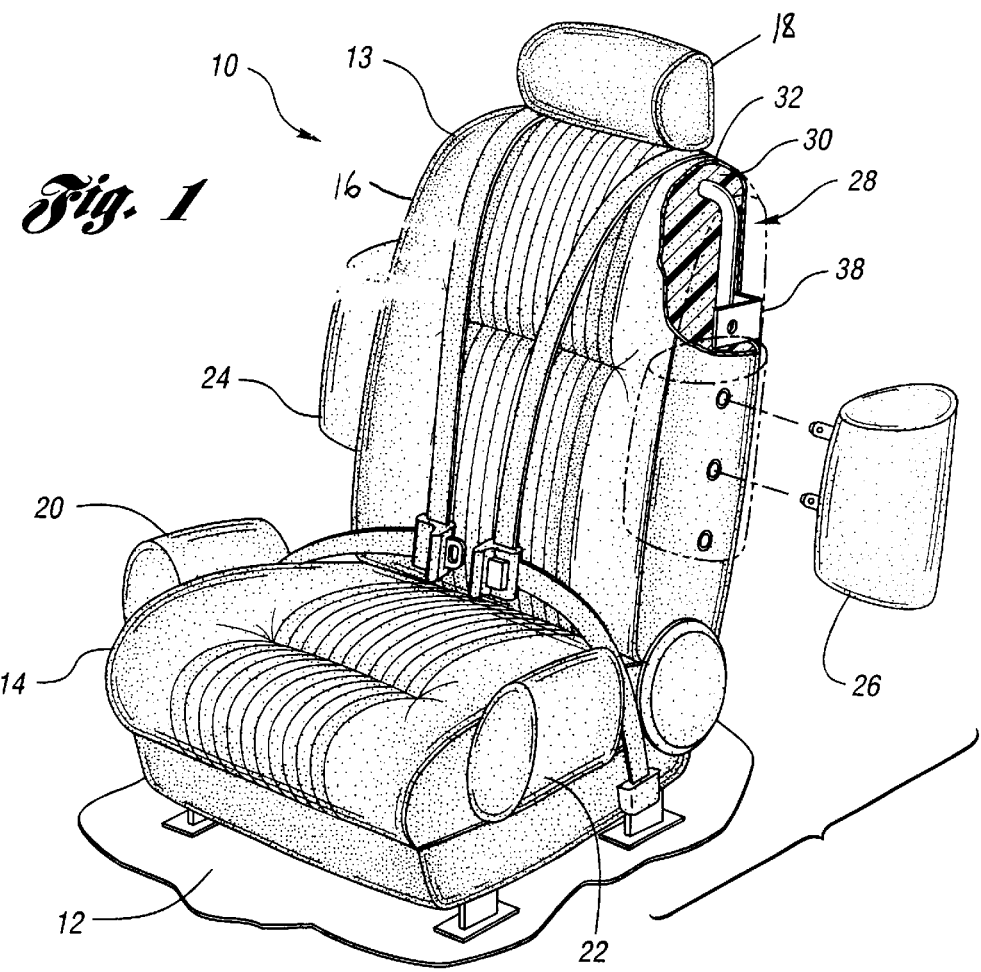
FIG. 1 is a perspective view of a first embodiment of a vehicle seat assembly, according to the invention, which includes a frame assembly and first and second vertically adjustable upper bolsters.
Figure 2:
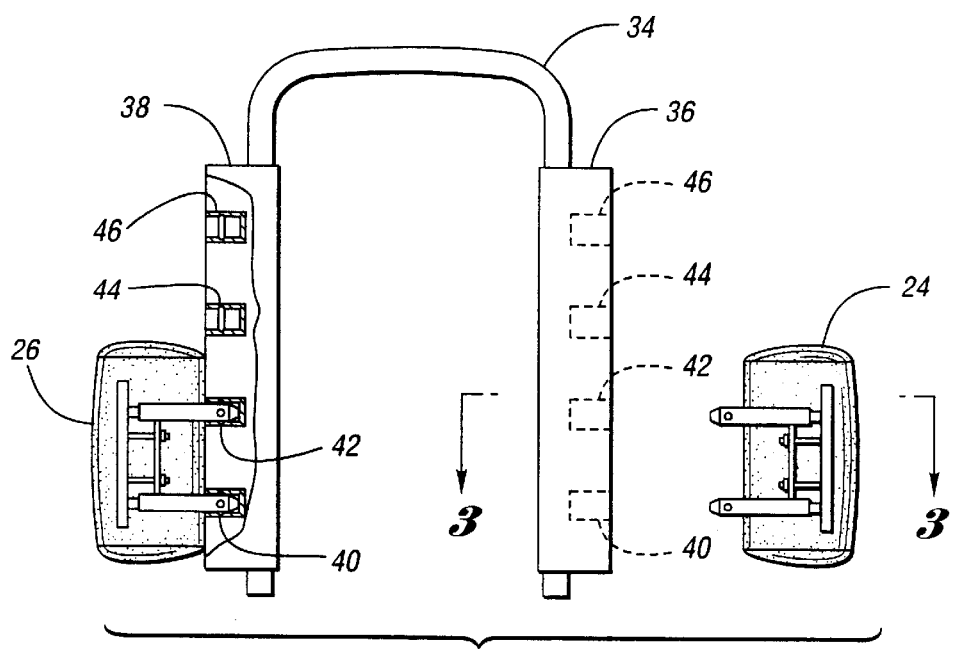
FIG. 2 is a rear view of the frame assembly and upper bolsters.
Figure 3:
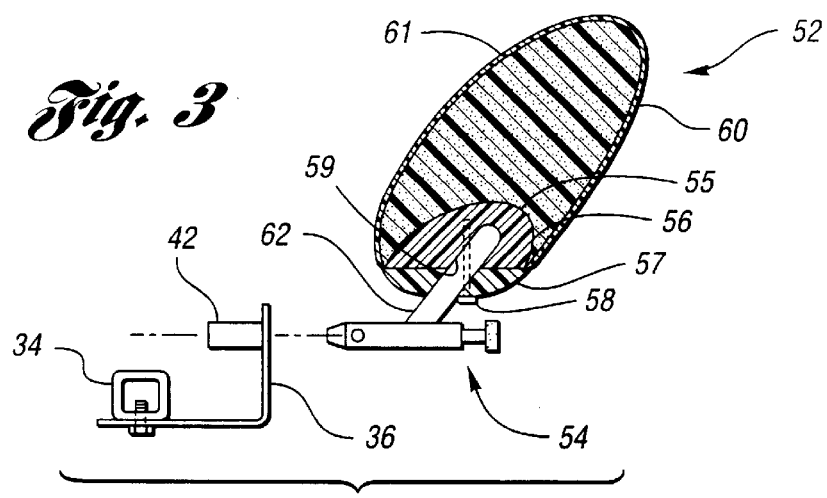
FIG. 3 is a cross-sectional view of the frame assembly and first upper bolster taken along line 3—3 of FIG. 2.
Figure 4:
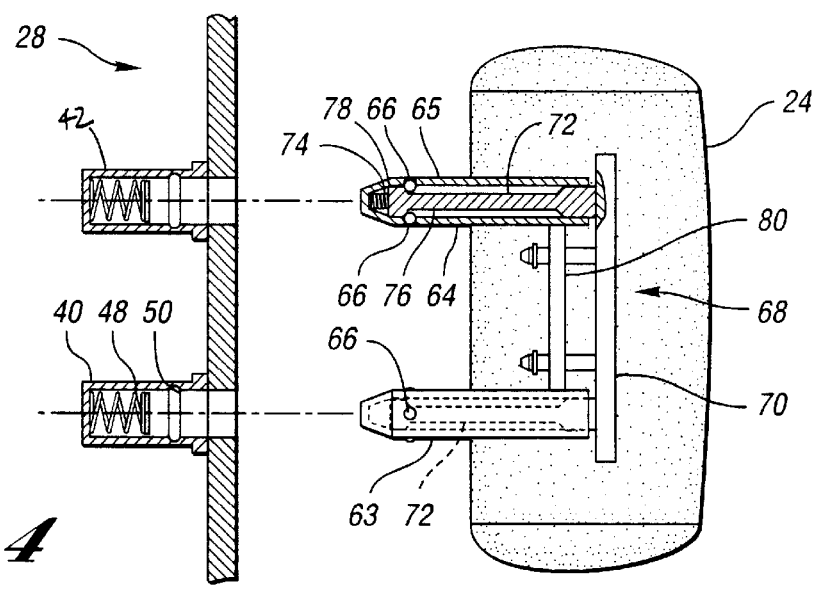
FIG. 4 is a rear fragmentary view of the frame assembly and first upper bolster partially in section, and showing a release mechanism of the first upper bolster in a release position.
Figure 5:
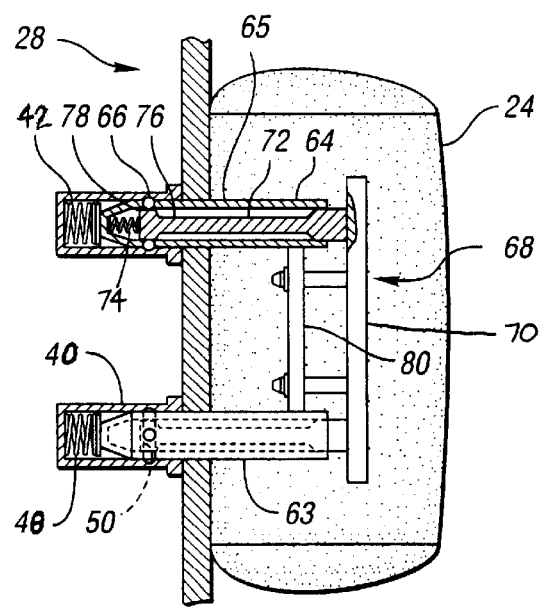
FIG. 5 is a rear fragmentary view similar to FIG. 4 showing the first upper bolster engaging the frame assembly with the release mechanism in a locking position.

Referring to the Figures, wherein like numerals reference like parts, FIG. 1 shows a vehicle seat assembly 10 according to the invention for use with a vehicle 12. The seat assembly 10 has a seat body 13 that includes a seat bottom 14 and a seat back 16 pivotally connected to the seat bottom 14. A headrest 18 is moveably connected to the seat back 16. The seat assembly 10 further includes first and second lower bolsters 20 and 22, respectively, connected to the seat bottom 14, and first and second upper bolsters 24 and 26, respectively, engageable with the seat back 16 such that the upper bolsters 24 and 26 are longitudinally or vertically adjustable with respect to the seat back 16 as explained below in greater detail.

Referring to FIGS. 1 through 5, the seat back 16 includes a frame assembly 28 surrounded by cushioning material, such as foam 30, and a cover material 32. The frame assembly 28 has a frame body 34 and first and second bolster mounting portions, such as first and second bolster mounting brackets 36 and 38, respectively, attached to the frame body 34. The bolster mounting brackets 36 and 38 may be attached to the frame body 34 in any suitable manner such as with fasteners or by welding the bolster mounting brackets 36 and 38 to the frame body 34. Alternatively, the bolster mounting brackets 36 and 38 or other bolster mounting portions may be integrally formed as part of the frame body 34.

Each bolster mounting bracket 36 and 38 has a plurality of receptacles, including first, second, third and fourth receptacles 40, 42, 44 and 46. Each receptacle 40–46 preferably includes a spring 48 and a circumferential groove 50.

The upper bolsters 24 and 26 are preferably similar in construction and function. Thus, while this detailed description will focus primarily on the construction and operation of the first upper bolster 24, a thorough understanding of the second upper bolster 26 will be apparent therefrom. Referring to FIGS. 2 through 5, the first upper bolster 24 includes a cushioning member or bolster cushion 52 connected to a bolster support assembly 54. The bolster cushion 52 includes a bolster body 55 having a base 56 and a cover 57 attached to the base 56 such as with fasteners 58. The base 56 preferably comprises a rigid plastic material and has an aperture or groove 59. A cushioning material such as foam 60 is attached to the base 56, and a cover material 61 surrounds the foam 60.

The bolster support assembly 54 includes a support structure 62 that extends into the groove 59, and is attached to the bolster body 55 such as with the fasteners 58. The bolster support assembly 54 further includes first and second engaging members, such as first and second pins or posts 63 and 64, respectively, connected to the support structure 62. Each post 63 and 64 includes a post body 65 having a plurality of openings, and a plurality of retractable elements or projections, such as ball bearings 66, moveably disposed in the openings of the post body 65. Each ball bearing 66 has a diameter that is preferably slightly larger than a minimum diameter of a corresponding opening in a respective post body 65, so that the ball bearings 66 cannot be released from the post bodies 65. The posts 63 and 64 are insertable into the receptacles 40–46 of the first bolster mounting bracket 36, and the ball bearings 66 are engageable with the grooves 50 so as to lock the first upper bolster 24 to the frame assembly 28 at a desired vertical location.

The bolster support assembly 54 also includes a release mechanism 68 that is operable to allow the ball bearings 66 to retract. The release mechanism 68 preferably includes a trigger 70 having a pair of legs 72 that extend into the posts 63 and 64. The trigger 70 is moveable with respect to the posts 63 and 64 between a first or release position shown in FIG. 4, and a second or locking position shown in FIG. 5. The release mechanism 68 also includes a pair of springs 74 that cooperate with the legs 72 to urge the trigger 70 toward the locking position. Each leg 72 has a narrow portion 76 that allows the bearings 66 to move inwardly when the trigger 70 is in the release position, and an enlarged head 78 that urges the bearings 66 outwardly when the trigger 70 is in the locking position.

To mount the first upper bolster 24 to the frame assembly 28, the trigger 70 is first moved to the release position in any suitable manner, such as by manually squeezing the trigger 70 while also gripping a cross member 80. When the trigger 70 is in the release position, the posts 63 and 64 may be inserted into two of the receptacles 40–46. The trigger 70 may then be moved to the locking position, such as by releasing the trigger 70 and allowing the springs 74 to urge the trigger 70 to the locking position. When the trigger 70 is in the locking position, the ball bearings 66 are urged into engagement with the grooves 50. The trigger 70 may then be squeezed again in order to allow the ball bearings 66 to retract from the grooves 50 so that the first upper bolster 24 may be removed from the frame assembly 28. The first upper bolster 24 may then be longitudinally or vertically adjusted along the frame assembly 28.

Figure 6:
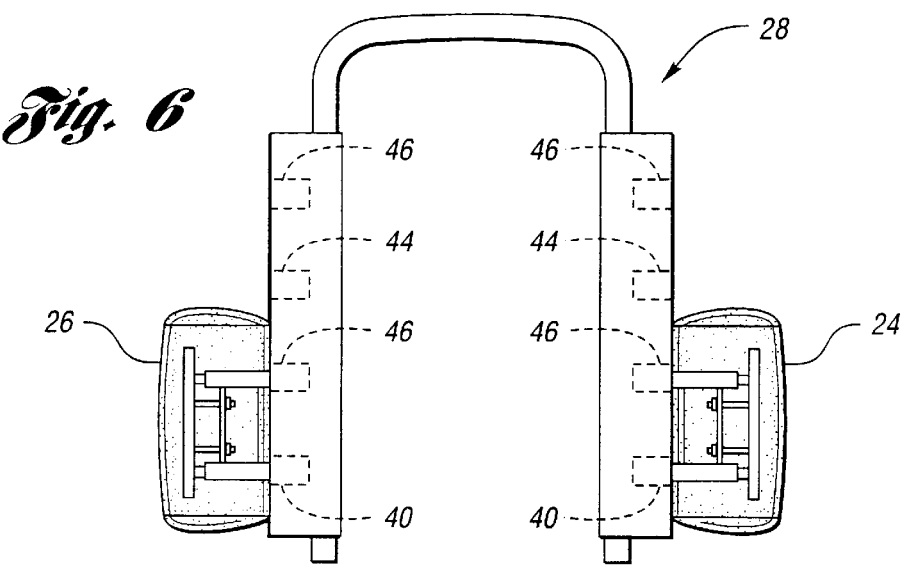
FIG. 6 is a rear fragmentary view of the frame assembly and first upper bolster with the first upper bolster in a first vertical position.
Figure 7:
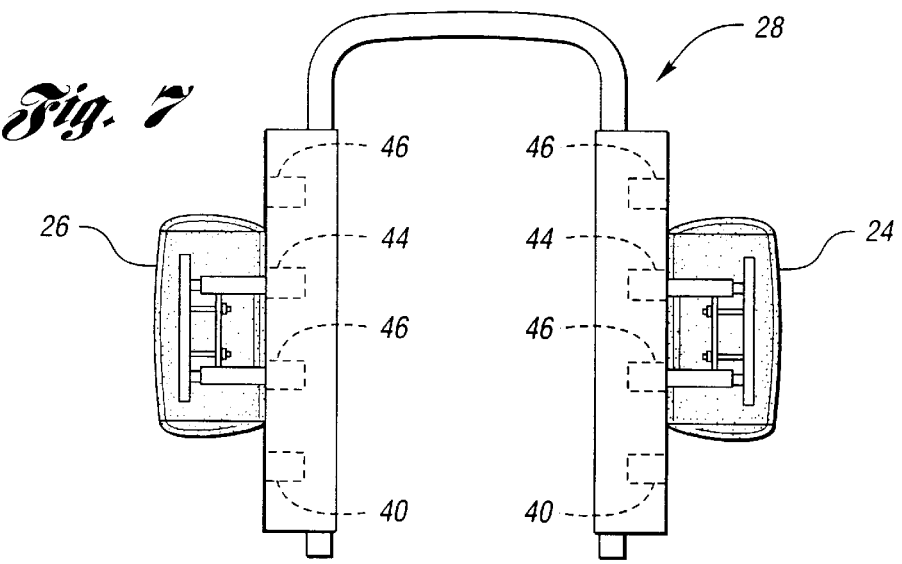
FIG. 7 is a rear fragmentary view of the frame assembly and first upper bolster with the first upper bolster in a second vertical position.
Figure 8:
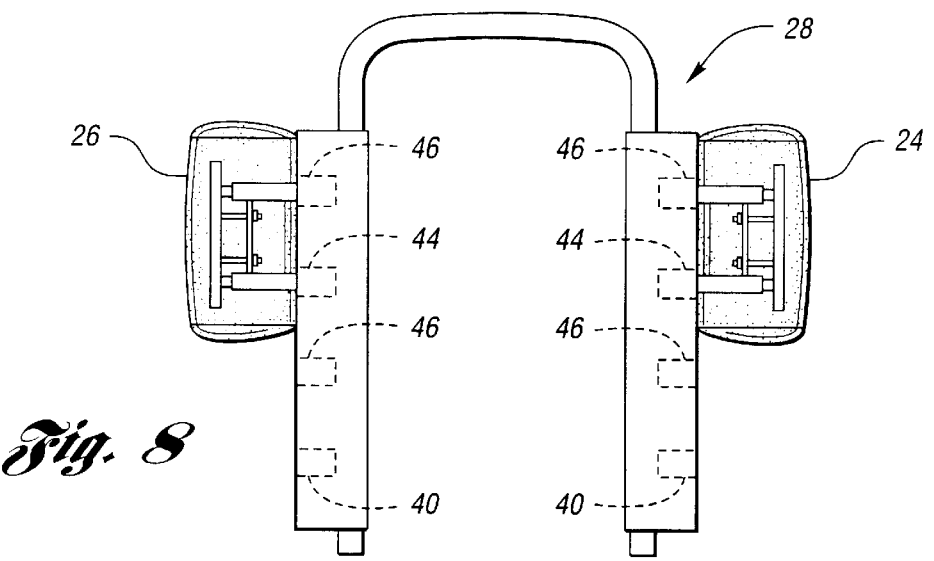
FIG. 8 is a rear fragmentary view of the frame assembly and first upper bolster with the first upper bolster in a third vertical position.

With such a configuration, the first upper bolster 24 may be moved between a first or lower position, shown in FIG. 6, a second or middle position shown in FIG. 7, and a third or upper position shown in FIG. 8. The second upper bolster 26 may also be adjusted in a similar manner. It is to be understood that the frame 28 may be provided with more or less receptacles than shown so as to achieve a desired adjustability of the upper bolsters 24 and 26. Furthermore, the seat bottom 14 and lower bolsters 20 and 22 may be provided with similar features as the seat back 16 and upper bolsters 24 and 26, respectively, so that the lower bolsters 20 and 22 may be adjusted longitudinally with respect to the seat bottom 14.

Figure 9:
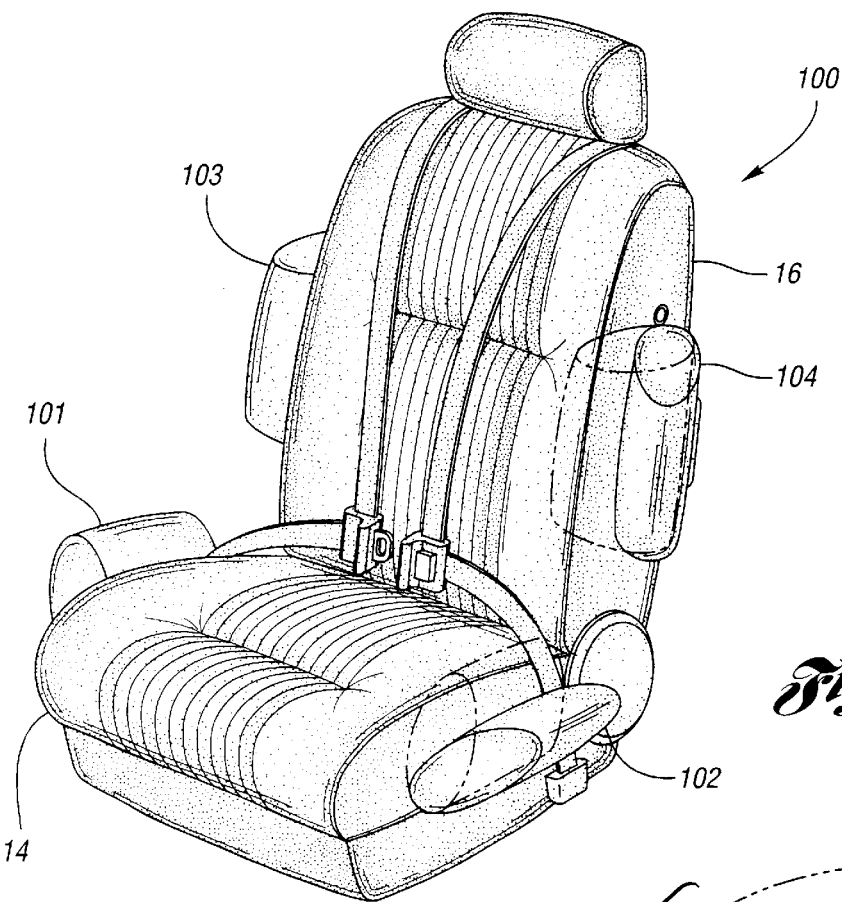
FIG. 9 is a perspective view of a second embodiment of the vehicle seat assembly, which includes upper and lower bolsters pivotally connected to a seat body.
Figure 10:
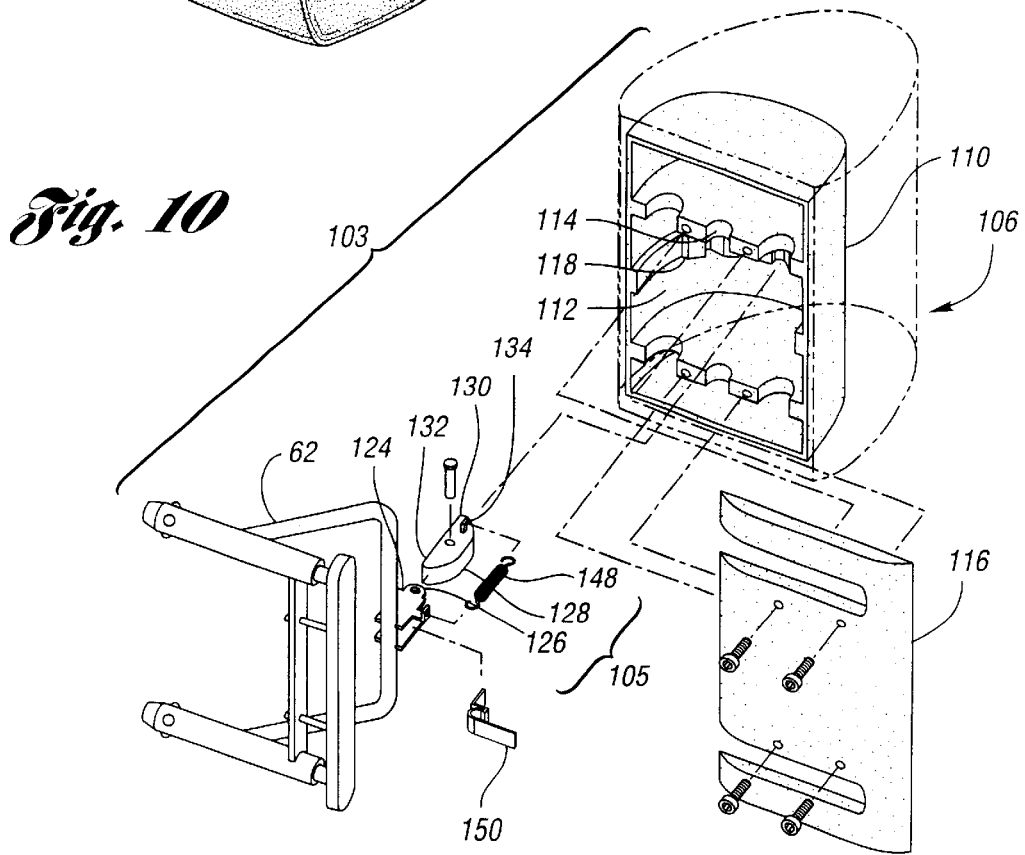
FIG. 10 is an exploded perspective view of a first upper bolster including a bolster cushion and ratchet mechanism for pivoting the bolster cushion with respect to the seat body.

FIG. 9 shows a second embodiment 100 of the vehicle seat assembly, which includes first and second lower bolsters 101 and 102, respectively, pivotally connected to the seat bottom 14, and first and second upper bolsters 103 and 104, respectively, pivotally connected to the seat back 16. Each lower bolster 101 and 102 is pivotable about a longitudinal axis L, and each upper bolster 103 and 104 is pivotable about a longitudinal axis U. The bolsters 101–104 are also longitudinally adjustable with respect to the seat body 13 in a manner similar to that described with respect to the vehicle seat assembly 10. The bolsters 101–104 are preferably similar in construction and function. Thus, while this detailed description will focus primarily on the construction and operation of the first upper bolster 103, a thorough understanding of the other bolsters 101, 102 and 104 will be apparent therefrom.

Referring to FIGS. 10 through 13, the first upper bolster 103 includes all of the features of the first upper bolster 24, and further includes a pivot mechanism such as a ratchet mechanism 105 connected between a bolster cushion 106 and the support structure 62. The rachet mechanism 105 enables the bolster cushion 106 to pivot in an inward or forward direction 107 and an outward or rearward direction 108 as explained below in greater detail. The bolster cushion 106 is similar to the bolster cushion 52, but includes a bolster body 109 that is rotatably connected to the support structure 62. The bolster body 109 includes a base 110 having a cavity 112 and a groove 114 for receiving the support structure 62. A cover 116 is attached to the base 110 for retaining the support structure 62 within the groove 114 such that the bolster cushion 106 can rotate with respect to the support structure 62.

The ratchet mechanism 105 is disposed in the cavity 112 and is operatively connected between the support structure 62 and the bolster body 109 for providing inward or forward ratcheting pivotal movement of the bolster cushion 106 relative to the support structure 62, while locking the bolster cushion 106 against outward or rearward pivotal movement. The ratcheting mechanism 105 includes a ratchet 117 pivotally coupled to the support structure 62, and a rack 118 fixedly secured to the base 110 and having a plurality of rack teeth 120 that define a plurality of notches or pockets 122. Preferably, the rack 118 is integrally formed as part of the base 110.

The ratchet 117 comprises a support member 124 welded or otherwise fixedly secured to the support structure 60, and having a pivot aperture 126. A pawl 128 is pivotally coupled to the support member 124 for selectively engaging the rack teeth 120. For example, the pawl 128 may be connected to the support member 124 with a pivot pin that extends through the pivot aperture 126.

The pawl 128 has a rack engaging portion 130, a support member engaging portion 132 and a spring attachment tab 134. The rack engaging portion 130 includes an inclined camming surface 136 facing rearwardly that is engageable with inclined camming surfaces 138 of the rack teeth 120. The camming surfaces 136 and 138 cooperate to enable the bolster cushion 106 to pivot forwardly. The rack engaging portion 130 also includes a first locking surface 140 facing forwardly that is engageable with rearwardly facing locking surfaces 142 of the rack teeth 120 to inhibit the bolster cushion 106 from pivoting rearwardly. The support member engaging portion 132 has a second locking surface 144 that is engageable with an inner locking surface 146 of the support member 124.

The ratchet mechanism 105 further includes first and second biasing members or springs 148 and 150, respectively. The first spring 148 has one end connected to the support member 124 and an opposite end connected to the spring attachment tab 134 for biasing the pawl 128 toward an upstanding operational position shown in FIG. 11. The second spring 150 is preferably a torsion spring that urges the bolster cushion 106 toward rearward pivotal movement. The second spring 150 has one end that engages the support member 124, and an opposite end that engages an inner surface of the cavity 112.

With reference to FIG. 12, a starting position is established by the bolster cushion 106 being disposed in a rearward most position with the rack engaging portion 130 of the pawl 128 being disposed adjacent the forward most rack tooth 120. The bolster cushion 106 may then be pivoted in the forward direction 107 by manually rotating the bolster cushion 106 so that the pawl 128 ratchets between adjacent rack teeth 120. As the bolster cushion 106 is rotated forwardly, the first spring 148 biases the pawl 128 in a clockwise direction. The second spring 150 biases the locking surface of the pawl 128 against the locking surface 142 of the associated rack tooth 120 to maintain the angularly adjusted position of the bolster cushion 106.

When the bolster cushion 106 is rotated completely forwardly, as shown in FIG. 13, the camming surface 136 of the pawl 128 engages a forwardly facing projection 152 formed as a continuous extension of the rearward most rack tooth 120. The forwardly facing projection 152 causes the pawl 128 to rotate counterclockwise about the pivot aperture 126 to a knocked over inoperative position. As the pawl 128 rotates toward the knocked over inoperative position, the line of force of the first spring 148 passes over center of the pivot aperture 126, thereby causing the first spring 148 to bias the pawl 128 in a counterclockwise direction toward the knocked over inoperative position. In this position, the pawl 128 is disengaged from the rack teeth 120 of the rack 118 so that the bolster cushion 106 may be rotated rearwardly toward the starting position without the pawl 128 engaging the rack teeth 120. Upon reaching the rearward most position, the tip of the pawl 128 and/or the spring attachment tab 134 engages the locking surface 142 of the forward most rack tooth 120, or a rearwardly facing projection 154, forcing the pawl 128 to rotate clockwise to the upstanding operational position, and further causing the line of force of the first spring 148 to pass over center of the pivot aperture 126 so that the first spring 148 urges the pawl 128 toward the upstanding operational position.

FIGS. 14 through 16 show a third embodiment 200 of the vehicle seat assembly according to the invention. The seat assembly 200 has a seat body 202 that includes a seat bottom 204, a seat back 206 and a lockable pivot mechanism 208 connected between the seat bottom 204 and seat back 206. The pivot mechanism 208 enables the seat bottom 204 and seat back 206 to be folded together, as shown in FIG. 15. The seat assembly 200 further includes first and second lower bolsters 210 and 212, respectively, pivotally connected to the seat bottom 204, and first and second upper bolsters 214 and 216, respectively, pivotally connected to the seat back 206. Each lower bolster 210 and 212 is pivotable about a longitudinal axis L, and each upper bolster 214 and 216 is pivotable about a longitudinal axis U.

The pivot mechanism 208 includes an inner rod 218 connected to the seat bottom 204 and an outer tube 220 connected to the seat back 206 and rotatably coupled to the inner rod 218. The inner rod 218 has a first aperture 222, and the outer tube 220 has a second aperture 224 alignable with the first aperture 222. An engaging member 226 is disposable in the apertures 222 and 224, and is moveable between a engaging or locking position shown in phantom lines in FIG. 16, and a release position shown in solid lines. The pivot mechanism further includes a spring 228 for urging the engaging member 226 toward the locking position. The pivot mechanism 208 may also be provided with a biasing member such as a torsion spring 230 for urging the seat back 206 toward the seat bottom 204. Furthermore, the pivot mechanism 208 may be provided with multiple engaging members to further inhibit rotational movement of the seat back 206 toward the seat bottom 204 when the engaging members are in the locking position.

Figure 17:
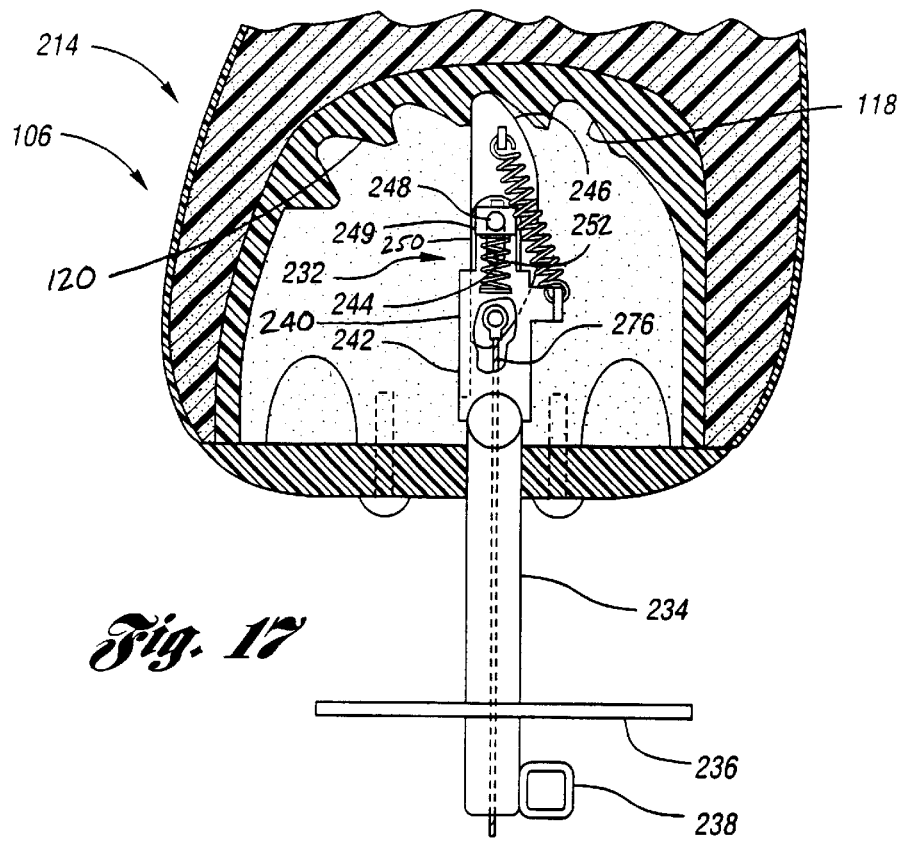
FIG. 17 is a cross-sectional view of the first upper bolster including a releasable ratchet mechanism shown in an operational position.

The bolsters 210–216 are preferably similar in construction and function. Thus, while this detailed description will focus primarily on the construction and operation of the first upper bolster 214, a thorough understanding of the second upper bolster 216 and the lower bolsters 210 and 212 will be apparent therefrom. Referring to FIG. 17, the first upper bolster 214 is similar in construction and function to the first upper bolster 103 described above, and includes a ratchet mechanism 232 connected between the bolster cushion 106 and a support structure 234. The support structure 234 is preferably fixedly mounted to the seat back 206. For example, the support structure 234 may be welded to a cushion pan 236 and/or frame 238, or connected with fasteners to the cushion pan 236 and/or frame 238.

The ratchet mechanism 232 is similar to the ratchet mechanism 105, and includes the rack 118 and a ratchet 240 connected to the support structure 234. The ratchet 240 includes a support member 242 welded or otherwise fixedly secured to the support structure 234, and having an elongated pivot aperture 244 extending therethrough. A pawl 246 is pivotally coupled to the support member 242 for selectively engaging rack teeth 120 of the rack 118. Fore example, the pawl 246 may be connected to the support member 242 with a pivot pin 248 and a pair of non-rotatable bushings 249 (only one bushing 249 is shown in FIG. 17) that support opposite ends of the pivot pin 248 and are moveable along the aperture 244. Each bushing 249 is disposed between a pair of outwardly projecting guide elements 250, which are preferably integrally formed as part of the support member 242. The support member 242 also preferably has a pair of stop elements or projections, one disposed above each pair of guide elements 250, for limiting movement of the bushings 249 toward the rack 118.

Figure 18:
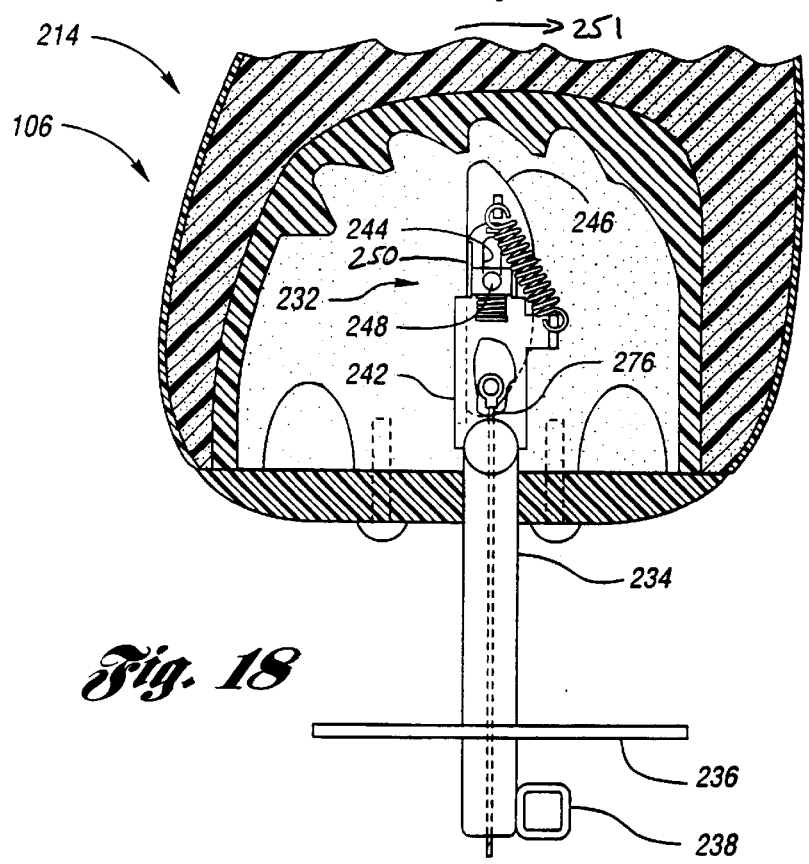
FIG. 18 is a cross-sectional view of the first upper bolster with the ratchet mechanism shown in a release position.
Figure 19:
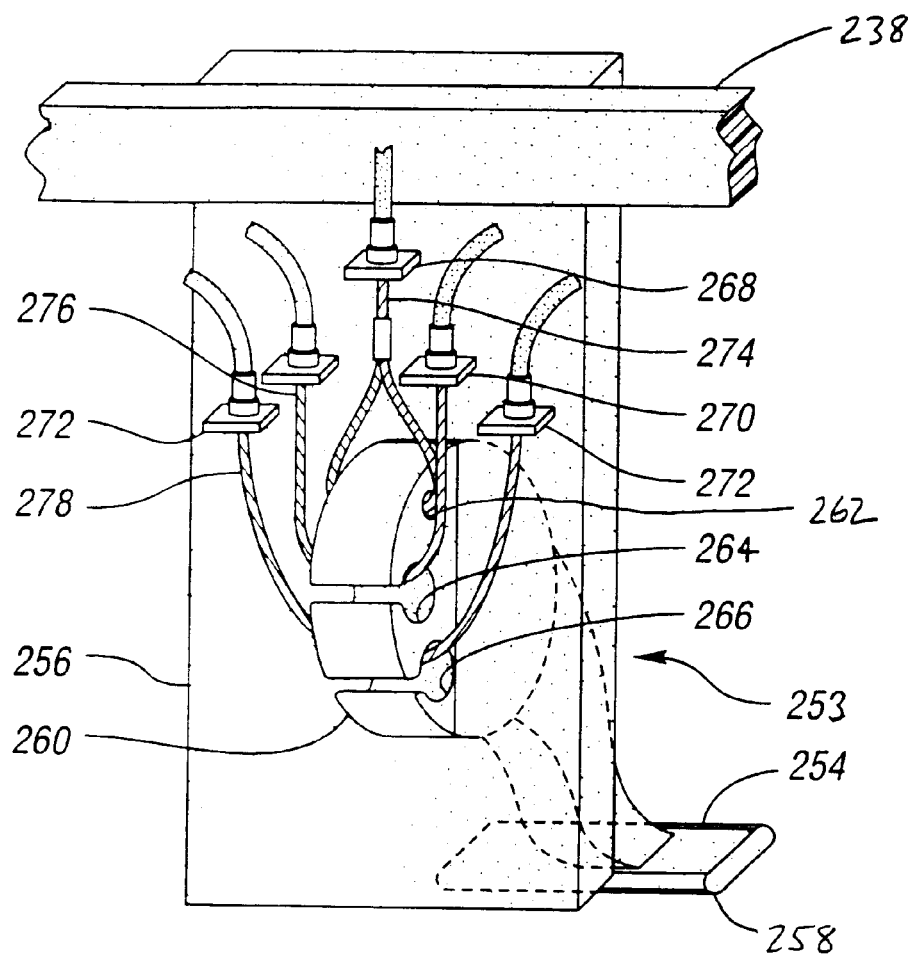
FIG. 19 is a perspective view of a release device for moving the pivot mechanism of the seat body and the ratchet mechanisms of the bolsters to their respective release positions.

The pawl 246 is connected to a release device, as explained below in greater detail, which is operable for moving the pawl 246 along the aperture 244 between an operational position shown in FIG. 17, and a release position shown in FIG. 18. When the pawl 246 is in the release position, the pawl 246 is disengaged from the rack 118 so that the bolster cushion 106 may rotate in an outward or rearward direction 251. The ratchet 242 further includes a pair of springs 252 (only one spring 252 is shown in FIGS. 17 and 18) that engage the bushings 249 and cooperate with the support member 242 for urging the pawl 246 toward the operating position. Alternatively, the ratchet 242 may be provided with only one spring 252 for urging the pawl 246 toward the operational position.

Referring to FIGS. 14 through 19, the vehicle seat assembly 200 further includes a release device 253 connected to the pivot mechanism 208 and each of the bolsters 210–216 for moving the pivot mechanism 208 and the ratchet mechanisms 232 of the bolsters 210–216 to their respective release positions. The release device 253 includes a release lever 254 rotatably connected to the seat back 206. For example, the release lever 254 may be rotatably connected to a mounting plate 256 that is fixedly secured to the frame 238. The release lever 254 includes a handle portion 258 and a cable engaging portion 260 having first, second and third apertures 262, 264 and 266, respectively. The mounting plate 256 has a first tab 268, a pair of second tabs 270, and a pair of third tabs 272. Each of the tabs 268–272 has an opening extending therethrough.

A first cable 274 extends from the first aperture 262, through the first tab 268 and to the engaging member 226 of the pivot mechanism 208. A second cable 276 is connected at opposite ends to the pawls 246 of the upper bolsters 214 and 216, and extends through the second tabs 270 and the second aperture 264 of the release lever 254. A third cable 278 is connected at opposite ends to the pawls 246 of the lower bolsters 210 and 212, and extends through the third tabs 272 and the third aperture 266 of the release lever 254. Depending on the location of the connections to the pawls 246, the cables 276 and 278 may need to be provided with some slack in order to allow the pawls 246 to rotate. Alternatively, the cables 276 and 278 may be connected to the bushings 249 of the bolsters 210–216.

When handle portion 258 of the release lever 254 is rotated upwardly, the first cable 274 moves the engaging member 226 to the release position so that the seat back 206 may rotate toward the seat bottom 204. In addition, when the handle portion 258 is rotated upwardly, the second and third cables move the pawls 246 of the bolsters 210–216 to their respective release positions so that the bolster cushions 106 of the bolsters 210–216 may rotate outwardly as shown in FIG. 15. As a result, the seat back 206 may be folded flat against the seat bottom 204. As explained above, torsion springs may be provided to facilitate movement of the various components. For example, each bolster 210–216 preferably includes a torsion spring, similar to the torsion spring 150, for urging a respective bolster cushion 106 outwardly.

When the release lever 254 is rotated downwardly, the pawls 246 return to their respective operational positions. Furthermore, when the seat back 206 is rotated away from the seat bottom 204 so that the apertures 222 and 224 of the pivot mechanism 208 align with each other, the engaging member 226 may return to the locking position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly for use with a vehicle having a floor, the vehicle seat assembly comprising:
    a seat body adapted to be attached to the floor of the vehicle and having a plurality of receptacles; and
    a bolster having a first engaging member that is selectively engageable with at least two receptacles such that the bolster is longitudinally adjustable with respect to the seat body;
    wherein each of the at least two receptacles has a groove, and the first engaging member includes a retractable element selectively engageable with the grooves, and wherein the bolster further includes a release mechanism that cooperates with the retractable element to allow the retractable element to retract, the release mechanism including a trigger that is moveable between a release position and a locking position, the trigger allowing the retractable element to retract when the trigger is in the release position, and the trigger urging the retractable element outwardly when the trigger is in the locking position.

2. The vehicle seat assembly of claim 1 wherein the seat body has a seat back that includes the plurality of receptacles, and the bolster is vertically adjustable with respect to the seat back.

3. The vehicle seat assembly of claim 2 wherein the plurality of receptacles includes first, second and third receptacles, and the bolster further has a second engaging member that is selectively engageable with the receptacles, wherein when the bolster is in a first vertical position, the first and second engaging members are respectively engaged with the first and second receptacles, and when the bolster is in a second vertical position different than the first vertical position, the first and second engaging members are respectively engaged with the second and third receptacles.

4. The vehicle seat assembly of claim 3 wherein the plurality of receptacles includes a fourth receptacle, wherein when the bolster is in a third vertical position different than the first and second vertical positions, the first and second engaging members are respectively engaged with the third and fourth receptacles.

5. The vehicle seat assembly of claim 2 wherein the bolster further includes a cushioning member and a pivot mechanism connected between the cushioning member and the first engaging member such that the bolster is laterally adjustable with respect to the seat back.

6. The vehicle seat assembly of claim 2 wherein the seat body further includes a seat bottom, and the seat back is pivotally connected to the seat bottom.

7. The vehicle seat assembly of claim 1 further including an additional bolster having an engaging member that is selectively engageable with at least two receptacles such that the additional bolster is longitudinally adjustable with respect to the seat body, wherein the bolsters are independently adjustable with respect to each other.

8. The vehicle seat assembly of claim 7 wherein the bolsters are positionable on opposite sides of the seat body.

9. The vehicle seat assembly of claim 1 further including a headrest connected to the seat body.

10. The vehicle seat assembly of claim 1 wherein each groove is a circumferential groove, and the retractable element is a retractable ball bearing that is selectively engageable with the grooves.

11. The vehicle seat assembly of claim 1 wherein each of the at least two receptacles includes a spring that is engageable with the first engaging member.

12. The vehicle seat assembly of claim 1 wherein the seat body includes a seat back having a top portion and a side portion, and the bolster is longitudinally adjustable along the side portion of the seat back.

13. The vehicle seat assembly of claim 12 further including a headrest connected to the top portion of the seat back.

14. A vehicle seat assembly comprising:
    a seat back having a frame, the frame having first and second bolster mounting portions, each bolster mounting portion having first, second and third receptacles; and
    first and second bolsters engageable with the first and second bolster mounting portions, respectively, each bolster having first and second posts and being longitudinally adjustable with respect to the seat back between a first longitudinal position and a second longitudinal position, wherein when each bolster is in the first longitudinal position, the first and second posts of the first bolster are respectively engaged with the first and second receptacles of the first bolster mounting portion, and the first and second posts of the second bolster are respectively engaged with the first and second receptacles of the second bolster mounting portion, and wherein when each bolster is in the second longitudinal position, the first and second posts of the first bolster are respectively engaged with the second and third receptacles of the first bolster mounting portion, and the first and second posts of the second bolster are respectively engaged with the second and third receptacles of the second bolster mounting portion.

15. The vehicle seat assembly of claim 14 wherein the first and second bolsters are independently adjustable with respect to each other.

16. A vehicle seat assembly comprising:
    a seat body including a seat bottom and a seat back pivotally connected to the seat bottom, the seat body further including a lockable seat back pivot mechanism connected between the seat back and the seat bottom for locking the seat back in a desired pivotal orientation with respect to the seat bottom;
    a bolster connected to the seat body, the bolster including a cushioning member and a pivot mechanism connected between the cushioning member and the seat body for allowing the cushioning member to pivot with respect to the seat body about a longitudinal axis, the pivot mechanism including a rack having a first pocket, and a pawl that is engageable with the first pocket so as to position the cushioning member in a first pivotal position relative to the seat body; and
    a release device connected between the seat body and the pawl for disengaging the pawl from the pocket so that the cushioning member may pivot outwardly with respect to the seat body, wherein the release device is further connected to the seat back pivot mechanism and is operable to release the seat back pivot mechanism so that the seat back and seat bottom may be folded together.

17. The vehicle seat assembly of claim 16 wherein the release device includes a release lever moveably connected to the seat body, and a cable connected between the release lever and the pawl.

18. A vehicle seat assembly comprising:
a seat body having a seat bottom and a seat back pivotally connected to the seat bottom;
a pair of upper bolsters connected on opposite sides of the seat back, each of the bolsters including a support structure connected to the seat body, a bolster body, and a ratcheting mechanism connected between the support structure and the bolster body for allowing the bolster body to pivot with respect to the seat back about a longitudinal axis, each ratcheting mechanism including a rack having a plurality of rack teeth, and a pawl that is selectively engageable with the rack teeth such that each ratcheting mechanism provides inward ratcheting pivotal movement of a respective bolster body while locking the respective bolster body against pivotal movement in an outward direction, each ratcheting mechanism further including a biasing member for urging a respective bolster body in the outward direction;
a pair of lower bolsters pivotally connected on opposite sides of the seat bottom, each lower bolster being pivotable inwardly and outwardly; and
a release device connected between the seat body and the pawls for disengaging the pawls from the racks so that each bolster body may pivot in the outward direction, thereby allowing the seat back and seat bottom to be folded together, wherein the release device is further connected to the lower bolsters and is operable to allow each bolster to pivot outwardly.

19. The vehicle seat assembly of claim 18 wherein the release device includes a release lever moveably connected to the seat body, and at least one cable connected between the release lever and the pawls.

20. The vehicle seat assembly of claim 18 wherein the seat body includes a lockable pivot mechanism connected between the seat back and the seat bottom for locking the seat back in a desired pivotal orientation with respect to the seat bottom, and wherein the release device is further connected to the pivot mechanism and is operable to release the pivot mechanism so that the seat back and seat bottom may be folded together.

21. The vehicle seat assembly of claim 18 wherein each lower bolster includes a lower support structure connected to the seat body, a lower bolster body, and a lower ratcheting mechanism connected between the lower support structure and the lower bolster body for allowing the lower bolster body to pivot with respect to the seat bottom, each lower ratcheting mechanism including a rack having a plurality of rack teeth, and a pawl that is selectively engageable with the rack teeth such that each lower ratcheting mechanism provides inward ratcheting pivotal movement of a respective lower bolster body while locking the respective lower bolster body against outward pivotal movement, each lower ratcheting mechanism further including a biasing member for urging a respective lower bolster body outwardly, wherein the release device is connected to the lower ratcheting mechanisms and is operable to disengage the pawls of the lower ratcheting mechanisms from the racks of the lower ratcheting mechanisms so that each lower bolster body may pivot outwardly.

22. A vehicle seat assembly comprising:
a seat body having a seat back that includes a plurality of receptacles; and
a bolster having a first engaging member that is selectively engageable with at least two receptacles such that the bolster is vertically adjustable with respect to the seat back, the bolster further including a cushioning member and a pivot mechanism connected between the cushioning member and the first engaging member such that the bolster is laterally adjustable with respect to the seat back.

23. A vehicle seat assembly comprising:
a seat body having a seat bottom and a seat back pivotally connected to the seat bottom, wherein the seat body includes a lockable pivot mechanism connected between the seat back and the seat bottom for locking the seat back in a desired pivotal orientation with respect to the seat bottom;
a pair of upper bolsters connected on opposite sides of the seat back, each of the bolsters including a support structure connected to the seat body, a bolster body, and a ratcheting mechanism connected between the support structure and the bolster body for allowing the bolster body to pivot with respect to the seat back, each ratcheting mechanism including a rack having a plurality of rack teeth, and a pawl that is selectively engageable with the rack teeth such that each ratcheting mechanism provides inward ratcheting pivotal movement of a respective bolster body while locking the respective bolster body against pivotal movement in an outward direction, each ratcheting mechanism further including a biasing member for urging a respective bolster body in the outward direction; and
a release device connected to the pivot mechanism and operable to release the pivot mechanism so that the seat back and seat bottom may be folded together, wherein the release device is further connected between the seat body and the pawls for disengaging the pawls from the racks so that each bolster body may pivot in the outward direction, thereby allowing the seat back and seat bottom to be folded together.

24. A vehicle seat assembly comprising:
a seat body having first, second and third receptacles; and
a bolster having first and second engaging members that are selectively engageable with the receptacles such that the bolster is longitudinally adjustable with respect to the seat body between a first position and a second position different than the first position, wherein when the bolster is in the first position, the first and second engaging members are respectively engaged with the first and second receptacles, and when the bolster is in the second position, the first and second engaging members are respectively engaged with the second and third receptacles;
wherein the first position is a first vertical position, and the second position is a second vertical position different than the first vertical position, and wherein the seat body includes first and second side portions and the bolster is longitudinally adjustable only along one of the side portions of the seat body.

25. The vehicle seat assembly of claim 24 wherein the seat body includes a seat back having a side position, and wherein the bolster is longitudinally adjustable along the side portion of the seat back.

26. A vehicle seat assembly comprising:

a seat body having a plurality of receptacles; and a bolster having a first engaging member that is selectively engageable with at least two receptacles such that the bolster is longitudinally adjustable with respect to the seat body;

wherein each of the at least two receptacles has a circumferential groove, and the first engaging member includes a retractable ball bearing that is selectively engageable with the grooves, the seat body includes a seat back having a side portion, and the bolster is longitudinally adjustable along the side portion of the seat back.

27. A vehicle seat assembly comprising:

a seat body having a plurality of receptacles; and a bolster having a first engaging member that is selectively engageable with at least two receptacles such that the bolster is longitudinally adjustable along a side of the seat body;

wherein each of the at least two receptacles includes a spring that is engageable with the first engaging member, the seat body includes a seat back having a side portion, and the bolster is longitudinally adjustable along the side portion of the seat back.

28. A vehicle seat assembly comprising:

a seat body having first, second and third receptacles; and a bolster having first and second engaging members that are selectively engageable with the receptacles such that the bolster is longitudinally adjustable with respect to the seat body between a first position and a second position different than the first position, wherein when the bolster is in the first position, the first and second engaging members are respectively engaged with the first and second receptacles, and when the bolster is in the second position, the first and second engaging members are respectively engaged with the second and third receptacles;

wherein the seat body includes a seat back having first and second side portions, and the bolster is longitudinally adjustable only along one of the side portions of the seat back.

* * * * *

UNITED STATES PATENT AND TRADEMARK OFFICE
CERTIFICATE OF CORRECTION

PATENT NO. : 6,802,563 B1
DATED : October 12, 2004
INVENTOR(S) : Todd A. Mysliwiec et al.

It is certified that error appears in the above-identified patent and that said Letters Patent is hereby corrected as shown below:

Column 13,
Line 8, after "groove," delete "and"

Signed and Sealed this

Fifteenth Day of March, 2005

JON W. DUDAS
*Director of the United States Patent and Trademark Office*